Feb. 21, 1967    H. KOEHL    3,304,980
CLINCH NUT
Filed Oct. 5, 1964    2 Sheets-Sheet 1

INVENTOR
HERMAN KOEHL
BY
ATTORNEY.

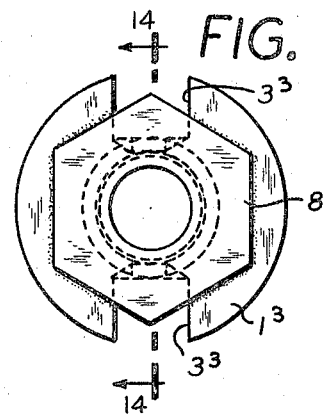
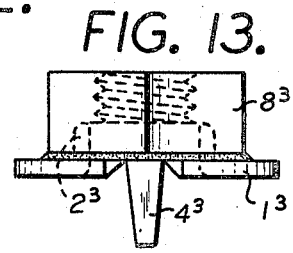
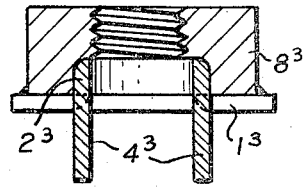
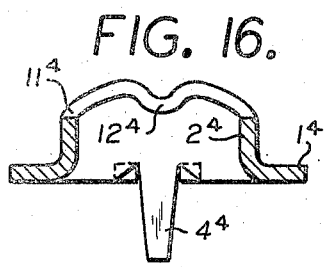
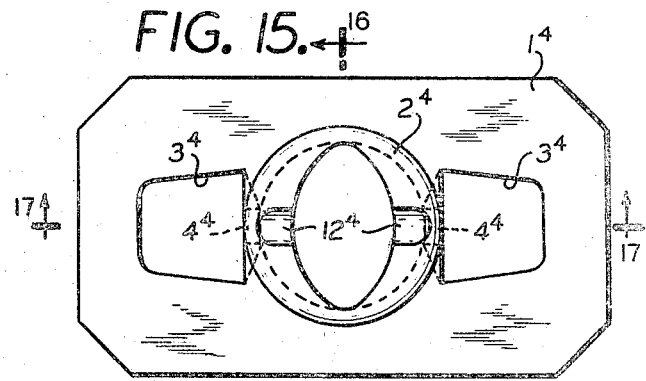
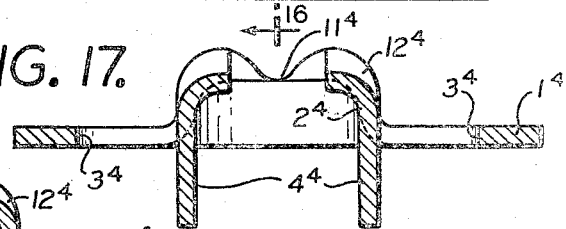
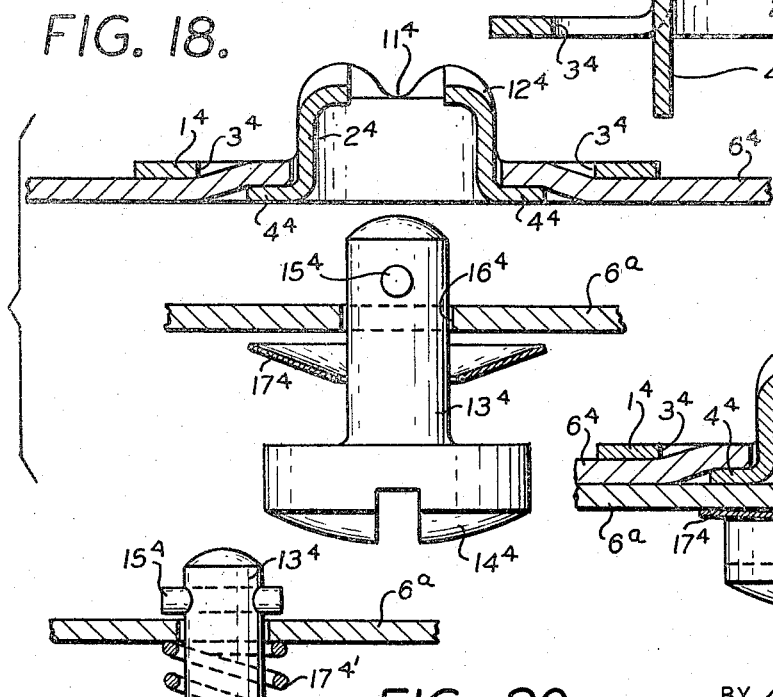
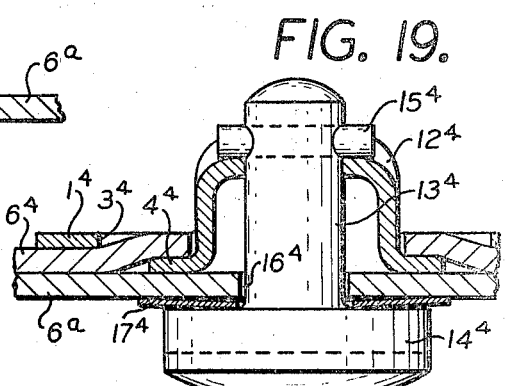
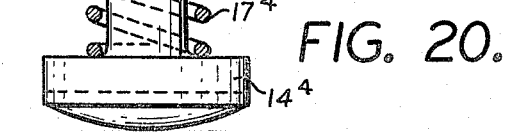

United States Patent Office 3,304,980
Patented Feb. 21, 1967

3,304,980
CLINCH NUT
Herman Koehl, Dayville, Conn., assignor to Heko, Inc., Brooklyn, Conn., a corporation of Connecticut
Filed Oct. 5, 1964, Ser. No. 401,378
8 Claims. (Cl. 151—41.72)

The present invention relates to a clinch nut, in general, and to a device for attaching nuts and similar members to thin plates of metal, plastic, nylon, or the like, whereby the nut or the like is interlocked with the plates, in order to prevent relative rotation between the nut and the plates, upon applying a torque action to the nut, in particular.

Clinch nuts are known which are equipped with a tubular projection having a groove about its periphery, which tubular projection extends in axial direction from a collar or flange disposed at the bottom portion of the nut. The tubular projection of the nut is received in a circular hole of the plate to which the nut is to be attached. The collar or flange of the nut is then pressed against the plate and the material of the latter surrounding the hole therein is supposed to cold flow into the groove of the tubular projection. Either the collar or the groove of the tubular projection are equipped with serrations, in order to prevent a rotation of the nut relative to the plate, upon applying a torque action to the nut.

These known clinch nuts have several drawbacks, as for instance, the fact that their use is limited to plate material capable of cold flowing. Furthermore, the nut cannot be used with very thin plate material, since the ability to cold flow is directly related to the thickness of the material. Also the holes to be driven into the plates have to be drilled or punched within a very close tolerance. In addition, the pressure on the flange during the mounting of the nut on the plate has to be applied very evenly about the flange, since the nut will be received otherwise in the hole of the plate at an angle, bringing about very poor retention.

There are other devices known attempting to accomplish a similar result, as stake nuts, rivet nuts, anchor nuts, weld nuts, cage nuts, and others, which are rather complicated and uneconomical in their manufacture and in their application to plates and which have inherently at least some of the drawbacks set forth above in connection with the known clinch nuts, as well as additional drawbacks due to their particular structure.

It is, therefore, one object of the present inveniton to provide a clinch nut which avoids the drawbacks of the known clinch nuts and which permits an economical manufacture thereof as well as an easy application to the plate.

It is another object of the present invention to provide a clinch nut which comprises a rectangular, oblong or round flange portion which can have also any other suitable configuration, and which flange portion is equipped with an axially extending open tubular portion projecting from the top of the flange portion. The flange portion has openings of a predetermined size on opposite sides of the tubular portion and at the point of meeting of the tubular portion with the opening prongs of predetermined length project axially from the tubular portion in a direction oposite to that of the tubular portion.

It is still another object of the present invention to provide a clinch nut, as set forth above, wherein the end of the tubular portion disposed opposite to the end to which the prongs are attached is provided with a single thread or with a quarter turn stud receiving member.

It is yet another object of the present invention to provide a clinch nut, as set forth above, wherein a thread is cut in the inner face of the tubular portion.

It is also a further object of the present invention to provide a clinch nut, as set forth above, wherein the nut is equipped with a recess complementary to and receiving the end of the tubular portion, which nut is properly secured to the flange portion, as for instance by welding.

It is also another object of the present inveniton to provide a clinch nut, as set forth above, wherein the flange is equipped with projections which attach the nut to the flange, which projections extend from the outer periphery of the flange and hold the nut on the flange simultaneously preventing the turning of the nut, upon applying a torque action thereto. This structure lends itself to an operation as a floating nut.

With these and other objects in view which will become apparent in the following detailed description, the present invention will be clearly understood in connection with the accompanying drawing, in which:

FIG. 12 is a top plan view of a fourth embodiment of the clinch nut designed in accordance with the present invention;

FIG. 13 is a front elevation of the clinch nut disclosed in FIG. 12;

FIG. 14 is a section along the lines 14—14 of FIG. 12;

FIG. 15 is a top plan view of a fifth embodiment of the clinch nut designed in accordance with the present invention;

FIG. 16 is a section along the lines 16—16 of FIG. 15;

FIG. 17 is a section along the lines 17—17 of FIG. 15;

FIG. 18 is an exploded section of the quarter turn stud receiving means disclosed in FIG. 17 with a complementary bolt and attached to a plate;

FIG. 19 is a section similar to that of FIG. 18 in mounted position; and

FIG. 20 is a section similar to that of FIG. 19, disclosing a variation in the spring.

Figure 1:
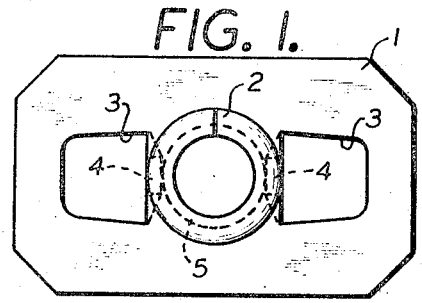
FIGURE 1 is a top plan view of a clinch nut.
Figure 2:
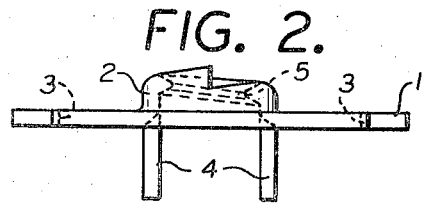
FIG. 2 is a rear elevation of the clinch nut disclosed in FIG. 1.

Referring now to the drawings, and in particular to FIGS. 1 to 5, the clinch nut comprises a flange member 1, which is of a rectangular, oblong, round or any other suitable shape and has a preferably integral centrally disposed and axially extending, open tubular portion 2 projecting from the top face of the flange member 1.

Substantially rectangular openings 3 of a predetermined size and having preferably rounded corners are cut out of the flange member 1 immediately adjacent to the tubular portion 2, such that one side of each of the openings 3 is disposed tangentially to the tubular portion 2. The flange member 1 is preferably rectangular or oblong and preferably complements the shape of the openings 3. Prongs 4 of a suitable, predetermined length extend from the tubular portion 2 in an axial direction opposite to that of the tubular portion 2 from each side of the center where the rectangular openings 3 meet with the centrally disposed tubular portion 2. Thus the tubular portion 2 serves, among other functions, also the important function of providing a solid connection between the prongs 4 and the flange member 1.

The end of the tubular portion 2, disposed opposite to the end to which the prongs 4 are attached, is equipped in the first embodiment, as disclosed in FIGS. 1 to 5, with a single formed thread 5.

Figure 3:
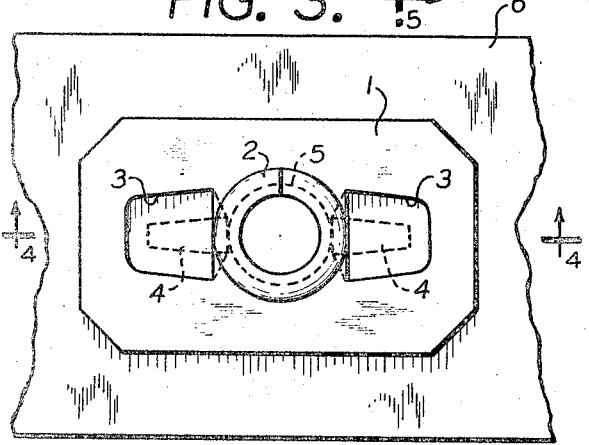
FIG. 3 is a top plan view of the same embodiment of the clinch nut, disclosed in FIG. 1, designed in accordance with the present invention, mounted on a plate.
Figure 4:
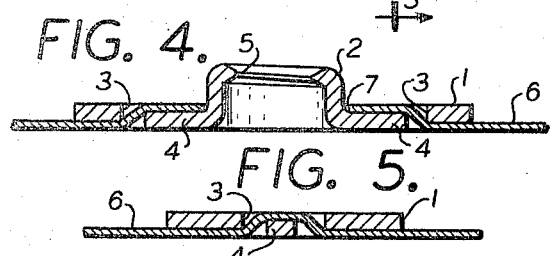
FIG. 4 is a section along the lines 4—4 of FIG. 3.
Figures 5, 6:
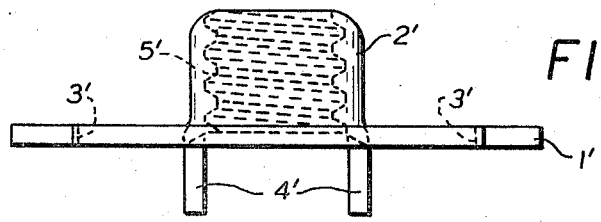
FIG. 5 is a section along the lines 5—5 of FIG. 4.
FIG. 6 is a front elevation of a second embodiment of the clinch nut designed in accordance with the present invention.
Figure 7:
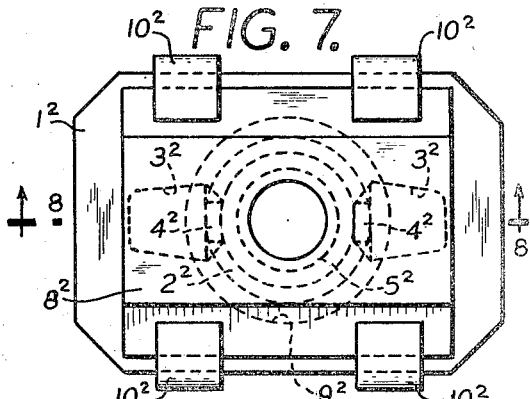
FIG. 7 is a top plan view of a third embodiment of the clinch nut designed in accordance with the present invention, formed as a floating nut.

The clinch nut designed in accordance with the present invention is adapted to be applied to a thin plate of metal, plastic, nylon, or the like, in a manner shown in FIGS. 3 to 5, of the drawings. Wherever a clinch nut is to be secured to a thin plate 6, a round hole 7 is at first drilled in or punched out of the thin plate 6. While the clinch nut is held firmly against the plate 6, the prongs 4 are spread or rolled outwardly towards the corresponding rectangular openings 3 of the flange member 1 by means of any appropriate tool (not shown), which is not the subject matter of the present invention. Upon engagement of the prongs 4 with the plate 6, the continued pressure applied to the prongs 4 urges the material of the thin plate 6 together with the prongs 4 into the rectangular openings 3 of the flange member 1, so that the prongs 4 form their own recesses in the thin plate 6. As a result of this action, the plate 6 is flush with one face of the flange member 1, while the other face of the flange member 1 engages the adjacent face of the plate 6, and the opposite face of the plate 6 is flush with the free face of the prongs 4, so that the total thickness throughout is no more than the sum of the thicknesses of the flange member 1 and of the thin plate 6.

As stated above any appropriate tool can be applied for the attachment of the clinch nut to the plate 6. Such tool may consist of a backing plate and a simple punch. If desired, the tools may be adapted for use in a pair of parallel jaw pliers or a small press. The clinch nut can be attached to the plate 6 by using a hammer, even by an unexperienced person. The force required to roll over the prongs 4 is rather small, and even if the attaching operation is not entirely completed, the tightening of a bolt in the clinch nut will complete the attaching operation.

Referring now again to the drawing and in particular to FIG. 6, a second embodiment of the clinch nut designed in accordance with the present invention is disclosed. The clinch nut comprises again a flange member 1' of rectangular or any other suitable shape and has again a centrally disposed and axially extending open tubular portion 2' projecting from the top face of the flange member 1'. The flange member 1' has substantially rectangular openings 3' and prongs 4' extend from the tubular portion 2' in an axial direction opposite to that of the tubular portion 2' from each side of the center where the rectangular openings 3' meet with the centrally disposed tubular portion 2'. In this embodiment a thread 5' is cut into the inner face of the tubular portion 2' which thread 5' is adapted to receive a bolt having complementary outer thread.

The attachment of the clinch nut to a thin plate is performed in the same manner set forth above in connection with the first embodiment.

Referring now again to the drawings, and in particular to FIGS. 7 to 11, a third embodiment of the clinch nut, designed in accordance with the present invention, has been disclosed, which is of a structure substantially identical with that of the second embodiment, as set forth above, with the exception that the nut itself is a separate member secured to the flange member by clamps to permit a rigid attachment or a floating attachment of the nut to the flange member.

Figure 8:
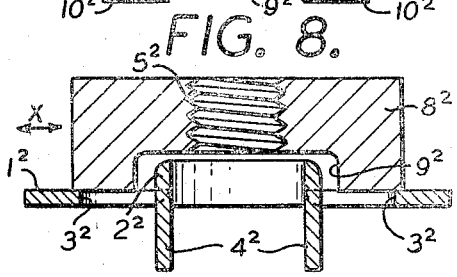
FIG. 8 is a section along the lines 8—8 of FIG. 7.
Figure 9:
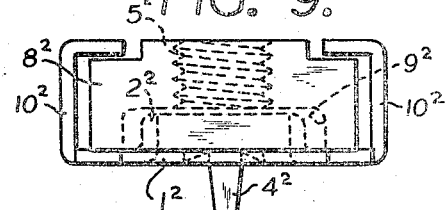
FIG. 9 is an end view of the clinch nut disclosed in FIG. 7.
Figure 10:
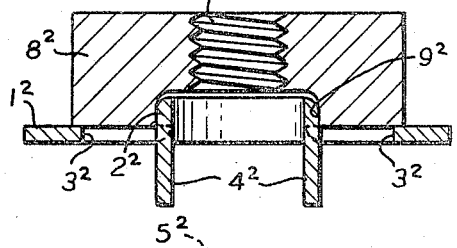
FIG. 10 is a section along the lines 8—8 of FIG. 7, similar to FIG. 8, however, formed as a non-floating nut.
Figure 11:
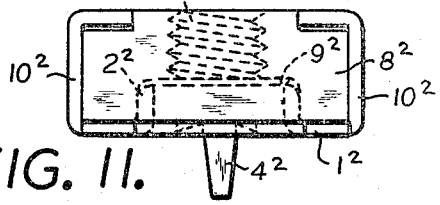
FIG. 11 is an end view of the clinch nut disclosed in FIG. 10.

In particular, this embodiment comprises again a flange member $1^2$ having also a tubular portion $2^2$ as well as substantially rectangular openings $3^2$. Prongs $4^2$ extend from the tubular portion $2^2$ in opposite direction, which serve the purpose of attaching the clinch nut to a plate in the manner described in connection with the previous embodiments. A nut member $8^2$, having a recess $9^2$ receiving the tubular portion $2^2$, is positioned on the flange member $1^2$. The latter is additionally equipped with clamping projections $10^2$ which retain the nut member $8^2$ in position on the flange member $1^2$, and in particular permit a limited radial movement by providing the recess $9^2$ of a diameter larger than the outer diameter of the tubular portion $2^2$, as it is shown in FIGS. 8 and 9, in order to provide a floating clinch nut, or the recess $9^2$ is of a diameter substantially equal with the outer diameter of the tubular portion $2^2$, in which case the nut member $8^2$ is rigidly secured to the flange member $1^2$ by means of the tubular portion $2^2$ and the clamping projections $10^2$.

Referring now again to the drawings, and in particular to FIGS. 12 to 14, a fourth embodiment of the clinch nut, designed in accordance with the present invention, is disclosed.

This embodiment comprises again a flange member $1^3$ which has a tubular portion $2^3$ and two oppositely disposed prongs $4^3$. The flange member $1^3$ has also two oppositely disposed rectangular openings $3^3$. A nut $8^3$ is welded to the flange member $1^3$, which nut $8^3$ has a recess complementary to the tubular portion $2^3$. The flange member $1^3$ is secured to a plate in the same manner as described in connection with the previous embodiments.

Referring now again to the drawings and in particular to FIGS. 15 to 20, a still further, fifth embodiment of the present invention is disclosed. This embodiment discloses a quarter turn stud receiving means designed in accordance with the present invention.

This embodiment comprises a flange member $1^4$ having a tubular portion $2^4$ as well as prongs $4^4$ extending in a direction opposite to that of the tubular portion $2^4$. The flange member $1^4$ has furthermore oppositely disposed rectangular openings $3^4$. As indicated in FIG. 18, the flange member $1^4$ is secured to a plate $6^4$ by rolling over the prongs $4^4$, in the same manner as in the previous embodiments.

The tubular portion $2^4$ is open and has a diametrically opposite sides axial slots $11^4$ (FIG. 16) and a diametrically disposed groove $12^4$, disposed 90° apart from the axial slots $11^4$ and adapted to receive a bolt $13^4$ having a head $14^4$. The bolt $13^4$ has close to its face end a cross pin $15^4$. The bolt $13^4$ extends through the bore $16^4$ of another plate $6^a$, which is to be secured to the plate $6^4$. A spring $17^4$ is disposed between the head $14^4$ and the plate $6^a$ and has the function to retain the cross-pin $15^4$ in the groove $12^4$ of the tubular portion $2^4$, as indicated in FIG. 19 of the drawings. The bolt $13^4$ is inserted into the tubular portion $2^4$ in a position wherein the cross-pin passes through the slots $11^4$. The bolt $13^4$ is then turned for 90° to set the cross-pin $15^4$ into the grooves $12^4$ and retained in this position by means of the spring $17^4$ which engages the plate $6^a$ and the head $14^4$ of the bolt $13^4$.

FIGS. 18 and 19 disclose a blade spring $17^4$, while, in a variation thereto, a helical spring $17^{4'}$ is provided instead, as clearly shown in FIG. 20.

The clinch nut designed in accordance with the present invention has numerous advantages over the known structures. In the first place, the present clinch nut does not project beyond the plate 6 on the opposite side of the nut. Since the thickness of the prongs 4 is equal to the thickness or depth of the opening in the flange member 1, it permits the prongs 4 to deform a portion of the plate 6 into the rectangular openings 3 for an amount which is equal with the thickness of the prongs 4, thus forming in the plate 6 a recess 3 and rendering the upper surface of the material of the plate 6 flush with the upper surface of the flange member 1. The total thickness of both the flange member 1 and the plate 6 does never exceed the combined thickness of both members.

Furthermore, the clinch nut is securely interlocked with the plate 6 against any torque action. Also the clinch nut can be securely fastened in a round hole of a plate which is easy to form by drilling or by means of a round punch. The clinch nut can be attached to very thin material including synthetic material, such as plastic. The prongs 4 provide also a guide for locating the nut in the bore of the plate 6. The clinch nut can be used with bores in the plate having a greater tolerance, than it is possible in the known structures. Furthermore, the spreading prongs will center the nut in the hole even if the bore is at the maximum tolerance. Finally, it is also an inherent advantage of the present clinch nut that it will not pop out from the plate 6 or become loose, when the plate 6 to which it is attached is slightly bent.

While I have disclosed several embodiments of the present invention, it is to be understood that these embodiments are given by example only and not in a limiting sense, the scope of the present invention being determined by the objects and the claims.

I claim:
1. A clinch nut, comprising
   a flange member,
   an axially extending, open tubular portion projecting from the top face of said flange member,
   said tubular portion including means for receiving a bolt therein,
   said flange member having openings substantially diametrically opposite each other and defined on one side by an edge of the material of said flange member disposed tangential to said tubular portion, as well as extending substantially equally on opposites sides of the point of tangency with said tubular portion,
   prongs extending axially straight and directly from and integrally secured to said tubular portion in a direction opposite to that of said tubular portion at the point of meeting of the tangential edge of said openings with said tubular portion,
   said prongs being substantially centrally located with respect to said tangential edge and said prongs being adapted to be fed through a hole of a plate, to which said clinch nut is to be attached, and said prongs to be turned over into said openings and clamping in the attached position said plate between said flange member and said turned over prongs, and
   said prongs being of a width substantially less than the width of said openings.
2. The clinch nut, as set forth in claim 1, wherein said means for receiving a bolt in said tubular portion comprises a single inner thread disposed at the free end of said tubular portion.
3. The clinch nut, as set forth in claim 1, wherein said means for receiving a bolt in said tubular portion comprises an inner thread disposed at the inner face of said tubular portion.
4. The clinch nut, as set forth in claim 1, which includes
   clamping projections extending upwardly from opposite sides of said flange member and from the same side of said flange member as said tubular portion and spaced radially from said tubular portion with their ends overlying the end surface of the nut, in order to prevent axial displacement, and said tubular portion and said clamping projections cooperating to prevent lateral displacement, and
   a nut member having a recess and engaging the top face of said flange member and receiving said tubular portion in said recess thereof.
5. The clinch nut, as set forth in claim 4, wherein said recess of said nut member is of a diameter larger than the outer diameter of said tubular portion, in order to permit slight movement of said nut member in a plane parallel to said flange member, to operate as a floating nut.
6. The clinch nut, as set forth in claim 4, wherein said recess of said nut member is of a diameter substantially identical with the outer diameter of said tubular portion, in order to retain said nut member substantially immovably in its mounted position.
7. The clinch nut, as set forth in claim 1, wherein said means for receiving a bolt in said tubular portion comprises a nut member having a recess in which the free end of said tubular portion is received, and said nut member is welded to the top face of said flange member.
8. The clinch nut, as set forth in claim 1, wherein said means for receiving a bolt in said tubular portion comprises an end formation of said tubular portion which includes two diametrically oppositely disposed axially extending slots and two crosswise disposed outer grooves set off for about 90° relative to said slots.

References Cited by the Examiner

UNITED STATES PATENTS

| | | | |
|---|---|---|---|
| 1,320,006 | 10/1919 | Higgs | 151—42 |
| 1,502,399 | 7/1924 | Renner | 85—32 |
| 1,753,791 | 4/1930 | Kiesel | 151—41.74 |
| 2,078,411 | 4/1937 | Richardson | 151—41.74 |
| 2,080,545 | 5/1937 | Ross | 151—41.72 |
| 2,102,554 | 12/1937 | Churchill. | |
| 2,146,128 | 2/1939 | Oldham | 151—41.72 |
| 2,233,224 | 2/1941 | Quarnstrom. | |
| 2,233,242 | 2/1941 | Burke | 151—41.72 |
| 2,314,075 | 3/1943 | Cousino. | |
| 2,361,979 | 11/1944 | Tarwater et al. | 151—41.74 |
| 2,373,722 | 4/1945 | Von Opel | 24—221.2 |
| 2,374,548 | 4/1945 | Leisure | 151—41.71 |
| 2,419,108 | 4/1947 | Barlow | 24—221.2 |
| 2,556,988 | 6/1951 | Swanson | 24—221.2 |
| 3,177,915 | 4/1965 | Fleur et al. | 151—41.72 |

FOREIGN PATENTS

| | | |
|---|---|---|
| 502,678 | 5/1954 | Canada. |
| 1,123,524 | 2/1962 | Germany. |
| 615,852 | 1/1949 | Great Britain. |

CARL W. TOMLIN, *Primary Examiner.*

EDWARD C. ALLEN, *Examiner.*

M. PARSONS, JR., *Assistant Examiner.*